United States Patent [19]

Heyman et al.

[11] Patent Number: 5,710,220
[45] Date of Patent: Jan. 20, 1998

[54] GRAFT POLYMER DISPERSION HAVING A THIRD MONOMER AND POLYURETHANE FOAMS HAVING A REDUCED TENDENCY TO SHRINK PREPARED THEREBY

[75] Inventors: Duane A. Heyman, Monroe; James A. Gallagher, Grosse Ile, both of Mich.

[73] Assignee: BASF Corporation, Mt. Olive, N.J.

[21] Appl. No.: 500,077

[22] Filed: Jul. 10, 1995

Related U.S. Application Data

[62] Division of Ser. No. 184,730, Jan. 21, 1994, abandoned.
[51] Int. Cl.[6] .......................... C08F 290/06; C08F 290/14
[52] U.S. Cl. .......................... 525/404; 525/170; 525/187; 525/445; 525/451; 525/472; 525/532; 526/274; 526/286; 526/320; 526/321; 526/333
[58] Field of Search .......................... 525/404, 445, 525/170, 187, 451, 472, 532; 526/286, 274, 320, 333, 321

[56] References Cited

U.S. PATENT DOCUMENTS 4,454,255   6/1984   Ramlow .......................... 521/137

*Primary Examiner*—Patricia A. Short
*Attorney, Agent, or Firm*—Fernando A. Borrego

[57] ABSTRACT

There is a provided a stable low viscosity graft polymer dispersion comprising from 25 to 60 weight percent based on the total weight of the polymer dispersion of at least three ethylenically unsaturated monomers polymerized in the presence of a reaction moderator and a free radical initiator in a polyol mixture initially containing less than 0.1 moles of induced unsaturation per mole of said polyol mixture. One of the monomers in the mixture of ethylenically unsaturated monomers is a hydroxylfunctional or aminofunctional $C_2$–$C_6$ alkyl methacrylate.

1 Claim, No Drawings

GRAFT POLYMER DISPERSION HAVING A THIRD MONOMER AND POLYURETHANE FOAMS HAVING A REDUCED TENDENCY TO SHRINK PREPARED THEREBY

This is a division of application Ser. No. 08/184,730 filed Jan. 21, 1994 abandoned.

FIELD OF THE INVENTION

This invention pertains to graft polymer dispersions having a particular third ethylenically unsaturated monomer added to the monomer mixture. Water blown molded polyurethane foams prepared with this graft polymer dispersion exhibit little or no shrinkage.

BACKGROUND OF THE INVENTION

A common problem encountered with molded polyurethane foams blown with water, especially high quantities of water exceeding 3.0 weight percent based on the total weight of the polyol composition, is that the foam will drastically shrink unless crushed with mechanical means while hot. Efforts have been made to chemically manipulate the polyurethane foam system to obviate the need for mechanical crushing means. The various attempts made to reduce foam shrinkage included using low activity surfactants, reducing the mount of ethylene oxide termination on the polyether polyol to slow its reactivity, or using a graft polymer dispersion prepared by the continuous process rather than by the semi-batch process. A wider particle size distribution is thought to aid in opening up more cells in the foam, which in turn reduces foam shrinkage. It is desirable, however, to obtain a polyurethane foam by using a graft polymer dispersion which is effective to reduce foam shrinkage without regard to its particle size distribution or its method of manufacture.

SUMMARY OF THE INVENTION

It is an object of the invention to obtain a water blown polyurethane foam exhibiting little or no shrinkage upon demold. It is also an object of the invention to use a graft polymer dispersion to effect a reduction in foam shrinkage prepared by a semi-batch or continuous method. It is a further object of the invention that this graft polymer dispersion have a high solids content, is stable, and has a low viscosity.

These objects have been met by incorporating a third ethylenically unsaturated monomer into the monomer mixture in the graft polyol dispersion. In particular, the graft polymer dispersion of the invention comprises from 25 to 60 weight percent, based on the total weight of the polymer dispersion, of a mixture of at least three ethylenically unsaturated monomers polymerized in the presence of a reaction moderator and a free radical initiator in a polyol mixture initially containing less than 0.1 moles of induced unsaturation per mole of said mixture, wherein at least one monomer in said mixture of ethylenically unsaturated monomers comprises a hydroxylfunctional or aminofunctional(2-(6-alkyl methacrylate. Molded polyurethane foams manufactured from this graft polymer dispersion are dimensionally stable and exhibit little or no shrinkage.

DETAILED DESCRIPTION OF THE INVENTION

In accordance with the invention, there is provided a mixture of at least three ethylenically unsaturated monomers polymerized in the presence of an effective amount of free radical initiator and a reaction moderator in an unsaturated polyol mixture having initially less than 0.1 moles of induced unsaturation per mole of polyol mixture; and preferably, the polyol mixture employs as pan of the mixture a polyetherester polyol prepared by the reaction of a polyoxyalkylene polyether polyol with maleic anhydride and an alkylene oxide. The polyetherester polyol may be isomerized by methods well known to those skilled in the art. These include heat or isomerization catalysts such as morpholine, dibutylamine, diethylamine, diethanolamine, thiols and salts and oxides of divalent metals. The polyols having induced unsaturation in the polyol mixture are referred to as "macromers."

The graft polymer dispersion of the invention employs at least three ethylenically unsaturated monomers, at least one of which is a hydroxylfunctional or aminofunctional $C_2$–$C_6$ alkyl methacrylate. The alkyl group may comprise two to six carbon atoms in the alkyl chain which may be branched with primary or secondary hydroxyl functionalities, or primary, secondary, tertiary amino functionalities. Suitable examples of the alkyl methacrylate employed in the mixture of ethylenically unsaturated monomers are 2-hydroxyethylmethacrylate, hydroxypropyl methacrylate, hydroxybutyl methacrylate, and dimethylaminoethyl methacrylate, with 2-hydroxyethyl methacrylate (HEMA) and dimethylaminoethyl methacrylate (DMAEMA) being most preferred.

The amount of the alkyl methacrylate monomer employed is an amount effective to produce a water blown polyurethane foam which has reduced shrinkage upon demold in comparison with the same foam made without the alkyl methacrylate. It is preferred that the foam produced by the graft polymer dispersion of the invention be dimensionally stable, and by "stable" it is meant a molded uncrushed foam which at 25° C. measures less than 3 mm from the deepest point of depression in the foam block to the bottom of a straight edge placed across the opposite comers of any side of the foam. It is more preferable that the foam is one which measures less than 1 mm, most preferably one which measures 0 mm. The amount of alkyl methacrylate may range from 5 weight percent to less than 50 weight percent based on the total weight of ethylenically unsaturated monomers present, and is preferentially present in amounts of from 10 weight percent to 25 weight percent. At these concentrations, one obtains a stable high water blown polyurethane foam which preferably exhibits no shrinkage at all.

The other two monomers in the monomer mixture are suitably any of the well-known ethylenically unsaturated monomers employed in the art. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene, and 4-methylstyrene, 2,4-dimethylstyrene, ethylstyrene, isopropylstyrene, butylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, N,N-dimethylacrylamide, N,N- dibenzylacrylamide, N-butylacrylamide, methacrylyl formamide, and the like; the vinyl esters such as vinyl acetate, vinyl butyrate, isopropenyl acetate, vinyl formate, vinyl acrylate, vinyl methacrylate, vinyl methoxyacetate, vinyl benzoate; vinyl ethers such as vinyl methyl ether, vinyl ethyl ether, vinyl propyl ethers, vinyl butyl ethers, vinyl 2-ethylhexyl ether, vinyl phenyl ether 2-methoxyethyl ether, methoxybutadiene, vinyl 2-butoxyethyl ether, 3,4-dihydro-1,2-pyran, 2-butoxy-2'-vinyloxydiethyl ether; vinyl ketones such as vinyl methyl ketone, vinyl ethyl ketone, vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsuffonate, methyl vinylsulfonate, N-vinyl pyrrole, vinyltoluene, vinylnaphthalene, and the like; dimethyl fumarate, dimethyl maleate, maleic acid, crotonic acid, fumaric acid, iraconic acid, monomethyl itaconate, t-bulylaminoethyl methacrylate, glycidyl acrylate, allyl alcohol glycol monoesters of iraconic acid, vinyl pyridine, and the like. Preferably, the other two monomers are acrylonitrile and styrene. More than a total of three monomers may be charged. A fourth or fifth monomer may be added to the mixture of the three monomers.

The amount of ethylenically unsaturated monomer mixture employed in the polymerization reaction is generally from 25 percent to 60 percent, preferably from 25 percent to about 50 percent, based on the total weight of the polymer dispersion. The polymerization occurs at a temperature between about 25° C. and 180° C., preferably from 80° C. to 135° C. It is preferred that at least 40 to 80 weight percent, based on the total weight of the monomer mixture, of the monomer employed is styrene or 4-methylstyrene. It is more preferred that the mount of each monomer is from 10 weight percent to 25 weight percent of the alkyl methacrylate such as HEMA or DMAEMA, 40 weight percent to 60 weight percent styrene, and 25 weight percent to 40 weight percent acrylonitrile, based on the total weight of the monomer mixture.

The monomers may be added as separate charges to a reaction chamber, or may be added as one or two mixed charges. For example, the styrene and alkyl methacrylate monomers may be added to the reaction chamber as a mixed charge along with a separate acrylonitrile charge.

In another embodiment, styrene, acrylonitrile, and the alkyl methacrylate monomers may be premixed and added to the reaction vessel as a single charge. By mixture of monomers is meant that at least three monomers are reacted, irrespective of the method of charging employed.

The polyol mixture to which the monomers are added comprises a macromer and carrier polyol, and polymerization proceeds in the presence of a polymerization initiator and a reaction moderator. The macromer may be prepared separately by reacting in the presence of an isomerization catalyst, a conventional polyol essentially free from ethylenic unsaturation with an organic compound having both ethylenic unsaturation and a hydroxyl, carboxyl, anhydride, isocyanate, or epoxy group; or they may be prepared by reacting the organic compound having both ethylenic unsaturation and a hydroxyl, carboxyl, anhydride, isocyanate, or epoxy group as a reactant in the preparation of the conventional polyol.

Representative conventional polyols essentially free from ethylenic unsaturation which may be employed in the preparation of macromers and which are also independently employed as the carrier polyol are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic aliphatic, and heterocyclic amines, as well as mixtures thereof. Alkylene oxide adducts of compounds which contain two or more different groups within the above-defined classes may also be used, for example, amino alcohols which contain an amino groups and a hydroxyl group. Also, alkylene oxide adducts of compounds which contain one SH group and one OH group as well as those which contain an amino group and an SH group may be used. Generally, the equivalent weight of the polyols essentially free from ethylenic unsaturation used to prepare the macromer and independently used as the carrier polyol will vary from 100 to 10,000, preferably from 1,000 to 3,000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, phthalic acid, hemimellitic acid, and 1,4-cyclohexanedicarboxylic acid. Any suitable polyhydric alcohol may be used such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a dime such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example combinations of polyoxypropylene and polyoxyethylene poly-1,2-oxybutylene and polyoxyethylene polyols, poly-1,4-tetramethylene and polyoxyethylene polyols, and copolymer polyols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4- diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541; and 3,639,542.

The induced unsaturated polyols, or macromers, which are employed in the invention may be prepared by reacting the above-mentioned conventional polyols with a compound having both ethylenic unsaturation and a hydroxyl, carboxyl, anhydride, isocyanate, or epoxy group. Representative of such organic compounds include mono- and polycarboxylic acids and anhydrides such as maleic acid and maleic anhydride, fumaric acid, crotonic acid and anhydride, propenyl succinic anhydride, acrylic acid, acryoyl chloride, hydroxyethyl acrylate or methacrylate or halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether), and the aryl or arylaliphatic isocyanates disclosed in U.S. Pat. No. 5,093,412, incorporated herein by reference, such as 1-(t-butylisocyanato)-3-isopropenylbenzene, which are believed to have the advantage of shorter reaction times and yield macromers and polyol dispersions having lower viscosities than macromers and polyol dispersions prepared with other of the aforementioned compounds having both ethylenic unsaturation and a hydroxyl, carboxyl, anhydride, or epoxy group. If a polycarboxylic acid or anhydride is employed to incorporate unsaturation into the polyols, it is preferable to react the unsaturated polyol with an alkene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

The alkylene oxides which may be employed for the preparation of the polyetherester polyols include ethylene oxide, propylene oxide, butylene oxide, amylene oxide, and mixtures of these oxides, preferably ethylene and propylene oxide.

The maleated macromers are isomerized at temperatures ranging from 80° C. to 120° C. for one-half hour to three hours in the presence of an effective amount of an isomerization catalyst. The catalyst is employed at concentrations greater than 0.01 weight percent based on the weight of the macromer and may be as high as 5.0 weight percent.

When preparing the polyetherester polyol employing the catalyst selected from the group consisting of salts and oxides of divalent metals, the concentration of catalyst which may be employed ranges from 0.01 to 0.5 weight percent, based on the weight of polyol mixture. The temperatures employed range from 75° C. to 175° C.

Among the divalent metals which may be employed are zinc acetate, zinc chloride, zinc oxide, zinc neodecanoate, tin chloride, calcium naphthenate, calcium chloride, calcium oxide, calcium acetate, copper naphthenate, cadmium acetate, cadmium chloride, nickel chloride, manganese chloride, manganese acetate, and cobalt naphthenate.

Certain of the above-mentioned catalysts such as calcium naphthenate promote the complete isomerization of the maleate to the fumarate structure during the preparation of the macromer, while others such as zinc chloride, which is an effective catalyst for the esterification, inhibit this isomerization.

The macromer unsaturation ranges from 0.1 mole to 1.5 mole of unsaturation per mole of the conventional polyol and, preferably, from 0.5 to 1.0 mole of maturation per mole of conventional polyol.

The process of the invention comprises reacting a mixture of monomers with a polyol mixture comprised of carrier polyol and macromer, in the presence of a polymerization initiator and a reaction moderator. This process may be carried out by the continuous or semi-batch method, as is disclosed in U.S. Pat. Nos. 4,454,255; 4,458,038; 4,661,531; 4,689,354; and 4,690,956; all of which are incorporated herein by reference. In the continuous method, a first continuous stream comprised of the mixture of monomers and reaction moderator is combined in a reaction vessel with a second continuous stream comprised of a carrier polyol, the macromer, the polymerization initiator, and optionally reaction moderator, reacted; and withdrawn from the reaction vessel on a continuous basis. In the semi-batch process, a first stream of the mixture of monomers is combined with a second stream comprising the carrier polyol, the polymerization initiator, and the reaction moderator in a reaction vessel containing more carrier polyol, the macromer, and more reaction moderator; allowed to react; and withdrawn from the reaction vessel once the reaction proceeds to completion. Thus, as can be seen by the difference between the two reaction methods, not all of the polyol mixture ingredients need be mixed into one stream prior to combining with the monomer mixture stream. The polyol mixture ingredients may be split up between a feed stream and the reaction vessel as in the semi-batch process. Further, the reaction moderator may be divided up between the two streams and the reaction vessel or any combination of these. However, the monomer mixture and the polymerization initiator are kept in separate streams to avoid premature polymerization of the mixture of monomers. Whichever method is employed, however, ultimately the mixture of monomers are polymerized in a polyol mixture comprised of conventional polyols essentially free of ethylenic unsaturation (the carrier polyol) and a macromer, in the presence of a reaction moderator and a polymerization initiator.

To initiate polymerization among the at least three monomers, any one of the well-known free radical polymerization initiators are employed. Examples include the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, p-menthane hydroperoxide, diacetyl peroxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalinhydroperoxide, α-methylbenzyl hydroxperoxide, α-methyl-α-ethyl benzyl hydroperoxide, tetrahydroperoxide, triphenylmethyl hydroperoxide, diphenylmethyl hydroperoxide, α,α'-azobis-(2-methyl heptonitrile), 1-t-butylazo-1-cyanocyclohexane, persuccinic acid, diisopropylperoxy dicarbonate, 2,2'-azobis (2,4-dimethylvaleronitrile), 2-t-butylazo-2-cyano4-methoxy-4-methylpentane, 2,2'-azo-bis-2-methylbutanenitrile, 2-t-butylazo-2-cyanobutane, 1-t-amylazo-1-cyanocyclohexane, 2,2'-azobis(2,4-dimethyl-4-methoxyvaleronitrile), 2,2'-azobis-1-methylbutyronitrile, 2-t-butylazo-2-cyano-4-methylpentane, 2-t-butylazo-2-isobutyronitrile, butylperoxyisopropyl carbonate and the like; a mixture of initiators may also be used. The preferred initiators are 2,2'-azobis(2-methylbutyronitrile), 2,2'-azobis (isobutyronitrile), 2,2'-azobis(2,4-dimethylvaleronitrile), 2-t-butylazo-2-cyano4-methoxy4-methylpentane, 2-t-butylazo-2-cyano-4-methylpentane, 2-t-butylazo-2-cyano-butane and lauroyl peroxide. Generally, from about 0.1 percent to about 10 percent, preferably from about 0.2 percent to about 2 percent, by weight of initiator based on the weight of the monomer will be employed in the process of the invention.

Materials commonly known as chain transfer agents to those skilled in the art are preferentially employed as reaction moderators. Although the chain transfer agents do reduce the molecular weight of the vinyl polymer formed, certain chain transfer agents also perform a function in dispersion polymerization not previously recognized in the art. Combined with the other components of this invention, these reaction moderators give lower viscosity, stable dispersions. In the absence of a reaction moderator, the dispersions of this invention have a higher viscosity, may settle or coagulate, and the vinyl polymer portion is not soluble in good solvents like N,N-dimethylformamide. The polymerization reaction may be carried out at temperatures between 25° C. and 180° C., preferably between 80° C. and 135° C. The polyol mixture contains initially less than 0.1 mole of induced unsaturation per mole of polyol mixture and ranges from 0.001 to 0.09 mole of unsaturation per mole of polyol, and preferably 0.002 to 0.02 mole of induced unsaturation per mole of polyol mixture.

Among those reaction moderators which may be employed are as follows: acetaldehyde, N,N-dimethylacetamide, acrolein, bis(2-ethoxyethyl)acetal, aniline, N,N-dimethylaniline, N,N-diethylaniline, anthracene, arabinose, 2-butanone, ethyl benzene, 1,4-butanediol, iodobenzene, vinyl benzoate, p-benzoquinone, 1-buten-3-yne, 1-butanol, carbon tetrabromide, chloroform, copper sulfate, crotonaldehyde, cumene, ethylene glycol, allyl alcohol, 2-vinyl-1,3-dioxolane, methyl-α-D-glycoside, glyceraldehyde, glycerol, 1,5-hexadien-3-yne, ferric chloride, isobutyl alcohol, methyl amine, 2,6-dimethyl-2,6-octadiene, 4-methyl-1-pentanol, 1-methyl piperidine, toluene, tributylamine, triethylamine, trimethylamine, tripropylamine, diphenylamine, 2-mercaptoethanol, 1-propanol, 2-octanol, 2-ethyl-1-hexanol, 4,4'-Bis(α,α-dimethylbenzyl)diphenylamine; and preferably 2-pentanol, thiophenol, 2-butanol, morpholine,2-propanol, bromotrichloromethane, 1-dodecanethiol, and tertiary dodecyl mercaptan. The reaction moderators are not limited to those listed above.

The reaction moderators employed will depend on the particular mixtures of monomers employed and the molar ratios of such mixtures. The concentration of the reaction moderator is that amount which is effective in producing low viscosity stable dispersions and may range from 0. 1 weight percent to 30 percent by weight based on the weight of monomer, preferably from 0.5 to 10.0 weight percent based on the weight of monomer.

The graft polymer dispersion of this invention have useful viscosities less than 10,000 cps at 25° C. Preferably, they have viscosities ranging from 2,000 to 8,000 cps at 25° C., more preferably, from 2,000 cps to 5,000 cps at 25° C.

The water-blown polyurethane foams employed in the present invention are generally prepared by the reaction of a graft polymer dispersion with an organic polyisocyanate in the presence of water as a blowing agent and optionally in the presence of additional polyhydroxyl-containing components, chain-extending agents, catalyst, surface-active agents, stabilizers, dyes, fillers, and pigments. Suitable processes for the preparation of cellular polyurethane plastics are disclosed in U.S. Reissue Pat. No. 25,514, together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes.

The graft polymer dispersions may also be employed in the preparation of polyurethane elastomers.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, mixtures of 4,4'- and 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate, and mixtures thereof. Especially useful due to their availability and properties are 4,4'-diphenylmethane diisocyanate, polymethylene polyphenylene polyisocyanate, or mixtures thereof for rigid foams or a mixture of the foregoing with toluene diisocyanates for semi-rigid foams.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred or crude isocyanates are disclosed in U.S. Pat. No. 3,215,652.

As mentioned above, the graft polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Chain-extending agents which may optionally be employed in the preparation of the polyurethane foams include those compounds having at least two functional groups bearing active hydrogen atoms, and preferably having molecular weights of less than 400, more preferably less than 300, such as water, hydrazine, primary and secondary diamines, amino alcohols, amino adds, hydroxy adds, glycols, or mixtures thereof. A preferred group of chain-extending agents includes water, ethylene glycol, 1,3-propanediol, 1,10-decanediol, dihydroxycyclohexane, diethylene glycol, 1,6-hexanediol, glycerine, trimethylol propane, 1,2,4,- 1,3,5-trihydroxycyclohexane, bis(2-hydroxyethyl) hydroquinone, 1,4-butanediol and primary and secondary dimes which react more readily with a prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

The amount of water employed as a blowing agent is effective to produce the desired foam density, preferably from 1 weight percent to 8 weight percent, based on the total weight of the polyol composition, more preferably from 3 weight percent to 5 weight percent. The density of the water-blown foams varies widely, but for most applications is from 2 pcf to 6 pcf, more preferably from 2 pcf to 4 pcf. Other volatile hydrocarbon blowing agents and HCFCs may be admixed with the water if desired such as butane, pentane, cyclopentane, hexane, cyclohexane, and the HCFCs having a ozone-depleting potential of less than 0.05.

Any suitable catalyst may be used, including tertiary amines, such as triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

Among the flames retardants which may be employed are pentabromodiphenyl oxide, dibromopropanot, tris(B-chloropropyl)phosphate, 2,2-bis(bromoethyl) 1,3-propanediol, tetrakis(2-chloroethyl)ethylene diphosphate, tris(2,3-dibromopropyl)phosphate, tris(8-chloroethyl)-phosphate, tris(1,2-dichloropropyl)phosphate, bis-(2-chloroethyl)2-chloroethylphosphonate, molybdenum trioxide, ammonium molybdate, ammonium phosphate, pentabromodiphenyloxide, tricresyl phosphate, hexabromocyclododecane, melamine and dibromoethyldibromocyclohexane. The concentrations of flame retardant compounds which may be employed range from 1 to 25 parts per 100 parts of polyol mixture.

The nature of the invention is illustrated through the following non-limiting examples. All parts are by weight unless otherwise specified.

Polyol A is a trimethylolpropane initiated polyoxypropylene polyoxyethylene polyether polyol terminated with 15 weight percent polyoxyethylene groups and having a nominal OH number of 2.5.

Macromer A is Polyol A containing 0.5 moles of fumarated unsaturation prepared by employing Procedure A.

Polyol B is a 31 weight percent 1:2 acrylonitrile:styrene graft polyol with Polyol C as the carrier, and having a Brookfield viscosity of about 3240 mPas at 25° C.

Polyol C is a glycerine initiated propylene oxide adduct terminated with 18.5 weight percent of polyoxyethylene groups and having a nominal OH number of 35.

Polyol D is a trimethylolpropane initiated propylene oxide adduct having about 13 weight percent terminal polyoxyethylene groups and a nominal OH number of 35.

Polyol E is a 93/7 parts by weight blend of Polyol C and glycerine, respectively.

Polyol F is a glycerine initiated ethylene oxide/propylene oxide heteric-block adduct with 10 weight percent of ethylene oxide added in to form a heteric adduct, and capped with 5 weight percent ethylene oxide, the polyol having a nominal OH number of 25.

Iso A is an 80/20 blend of 2,4- and 2,6-toluene diisocyanate, respectively.

Cat A is DABCO 33LV, a tertiary amine polyurethane catalyst.

Cat B is a 4 percent solution of calcium naphthenate in odorless mineral spirits.

NIAX A-1 is bis(N,N-dimethylaminoethyl)ether in dipropylene glycol, a blowing catalyst.

DC-5043 is a silicone surfactant available from Air Products.

NIAX C-225 is a blend of add blocked 33 percent solution of triethylene diamine in dipropylene glycol and NIAX A-1.

FOMREZ UL-1 is dibutyltin dimercaptide.

were permitted to discharge, so that the rate of charge and discharge corresponded to a turnover rate of 600 ml/30 minutes. About seven (7) reactor turnovers were made with only the last 600 ml collected and vacuum stripped at 12.5° C. and <2 mm Hg. The weight percent of the monomer in the graft dispersion polyol was based on the stripping loss of the last 600 ml, collected. The total amounts of each charge and the physical properties of the graft polyo dispersion are reported in Table 1 below.

The same procedure was followed with respect to Samples 2–4, differing only the type and amount of monomer charged. In Samples 2–3, 2-hydroxymethylmethacrylate was charged in the amounts indicated; and in Sample 4, no third monomer was charged. For each new sample, 600 ml of the previous sample was placed in the reactor flask to start the continuous process of polymerization.

TABLE 1

| SAMPLE | POLYOL C | MACROMER A | AN (g) | AN (%) | St (g) | St (%) | ACRYLATE HEMA | ACRYLATE HEA | FEED TIME (min.) | WEIGHT PERCENT VINYL POLYMER (calc.) | VISCOSITY mPas/25 C. |
|---|---|---|---|---|---|---|---|---|---|---|---|
| 1 | 2685.6 | 74.4 | 372 | 30 | 744 | 60 | | 124 g (10%) | 208 | 28.5 | 3100 |
| 2 | 2685.6 | 74.4 | 372 | 30 | 744 | 60 | 124 g (10%) | | 208 | 28.7 | 3010 |
| 3 | 2685.6 | 74.4 | 372 | 30 | 620 | 50 | 248 g (20%) | | 207 | 28.6 | 2940 |
| 4 | 2685.6 | 74.4 | 413.3 | 33.3 | 826.7 | 66.7 | 0 | | 210 | 28.8 | 3090 |

PROCEDURE A

The following charges were employed to make the Macromer 2,000 parts Polyol A; 30.6 pans maleic anhydride; 96 parts of ethylene oxide; 10 parts of Catalyst B (200 ppm calcium).

A three-liter, round-bottom flask with a stirrer, thermometer and gas inlet was charged with Polyol A, maleic anhydride and Cat B. The contents were heated to 125° C. and allowed to react for one (1) hour. This intermediate was transferred to a one-gallon steam heated stainless steel autoclave. After heating to 125° C. and pressurizing the reactor to 34 psig with nitrogen, ethylene oxide was added during one hour and the mixture was reacted for eight hours. The product was discharged from the reactor and the volatiles stripped at 105° C. for one hour at <10 mm Hg. This isolated product is designated as Macromer A.

EXAMPLE 1

Charges: To reaction flask.

Stream #1: acrylonitrile as indicated; styrene as indicated; 2-hydroxyethylmethacrylate (HEMA) as indicated; 1-dodecanethiol—18.6 grams.

Stream #2: Macromer A as indicated; Polyol C as indicated; VAZO 67—93 grams.

As the process was a continuous polymerization, 600 grams of graft Polyol B was added to a one-liter, 4-neck flask reaction flask fitted with a stirrer, nitrogen inlet, addition robe, water condenser, and thermowell, having a discharge robe on the underside of the flask, and heated to 115° C. to begin the process. The contents of the reactor flask were stirred at 300 rpm and kept at 115° C. throughout the reaction. After heating the Polyol B in the flask to 115° C., Stream #1 and Stream #2 were simultaneously charged to the reaction flask, while the contents of the reaction flask

EXAMPLE 2

Foam samples were prepared to measure the effect of each polyol on the foam shrinkage. The following foam formulation was employed to prepare each foam sample which corresponds to the graft polyol sample in Table 1:6134 grams of graft polyol, 18.66 grams Polyol D, 120 grams Polyol C, 8.0 grams water, 2.0 grams diethanolamine, 2.6 grams DC-5043, 0.75 grams Catalyst A, 0.2 grams NIAX A-1, and 92.2 grams of Iso A at an index of 100. The foam ingredients were handmixed and poured into a 10"×10"×4" aluminum mold preheated to about 150° F., allowed to react, and demolded. The foam shrinkage was measured by placing a straight edge from one corner of the foam block to the opposite corner and across the deepest point of a depression in an uncrushed foam block. The distance in millimeters from the deepest part of the depression to the bottom of the straight edge was measured. The procedure was repeated for the opposite side of the foam block. The smaller the number, the less shrinkage the foam had undergone. The results are reported below in Table 2.

TABLE 2

| FOAM SAMPLE | GRAFT SAMPLE | AIR FLOW (a) | DENSITY (pcf) | FOAM INDENTATION TOP/BOTTOM (mm) |
|---|---|---|---|---|
| 1 | 1 | 2.08 | 2.28 | 14/15 |
| 2 | 2 | 0.63 | 2.24 | 2/0 |
| 3 | 3 | 2.80 | 2.40 | 0/0 |
| 4 | 4 | 1.30 | 2.33 | 15/17 |

(a) = CRUSHED.

The results indicate that foam samples 1 and 4, made with graft polyols having a third monomer outside the scope of the invention or having no third monomer at all, exhibited shrinkage, while foam samples 2 and 3, made with a graft polyol having a third monomer within the scope of the invention, show a marked improvement in dimensional stability.

PROCEDURE B

The same procedure as employed in Procedure A was used to prepare Macromer B, using the following charges: 2,000 parts Polyol F; :30.6 parts maleic anhydride; 96 parts ethylene oxide; 10 parts Catalyst B (200 ppm calcium). The product was designated as Macromer B.

EXAMPLE 3

Charges: To reaction flask.

Stream #1: Acrylonitrile as indicated; styrene as indicated; dimethylaminoethyhnethacrylate (DMAEMA) as indicated; reaction moderator type and amount as indicated.

Stream #2: Macromer B—49.6 grams; Polyol type and mount as indicated; VAZO 67—9.3 grams.

The same procedure as employed in Example 1 was used for this example. The reaction conditions were as follows: total addition time of monomers Stream #1:210 minutes; total addition time of Stream #2:210 minutes; turnover rate of 600 ml/30 minutes, reaction temperature 115° C. (Sample 8 at 125° C.); stirred at 300 rpm. The amounts and types of other ingredients are reported below in Table 3. As in Example 1, 600 ml of the same or a similar graft polyol was used to start the continuous process.

Polyol D with a graft polyol to yield 12 percent vinyl solids based on the weight of the mixture of Polyol D and the graft polyol, water—4 pbw, diethanolamine—1.5 pbw, NIAX C-225—0.7 pbw, FOMREZ UL-1—0.015 pbw, DC-5043—1.5 pbw, and Iso A in an amount sufficient to react at an index of 100. The foam ingredients were mixed and poured into a preheated aluminum mold, allowed to react, and tested in an uncrushed state as in Example 2. Foam Sample 5, using graft sample 5, was 0/0 mm; Foam Sample 6, using graft polyol sample 6, was also 0/0 mm; Foam Sample 7, using morpholine as the reaction moderator, having only acrylonitrile and styrene in a 2:1 ratio without any DMAEMA, was 38/43.2 mm; and Foam Sample 8, using 1-dodecanethiol as the reaction moderator and having only acrylonitrile and styrene in a 1:2 ratio without any DMAEMA, measured 30/38 mm on top/bottom.

What we claim is:

1. A stable low viscosity graft polymer dispersion comprising from 25 to 60 weight percent based on the total weight of the polymer dispersion of a mixture of at least three ethylenically unsaturated monomers polymerized in the presence of a reaction moderator and a free radical initiator in a polyol mixture initially containing less than 0.1 moles of induced unsaturation per mole of said polyol mixture; wherein said mixture of ethylenically unsaturated monomers comprises (a) acrylonitrile, (b) 40 weight percent to 80 weight percent, based on the weight of the monomer

TABLE 3

| SAMPLE GRAFT | CARRIER POLYOL | | | MACROMER B | AN | | ST | | DMAEMA | |
|---|---|---|---|---|---|---|---|---|---|---|
| | POLYOL D | POLYOL C | POLYOL E | | GRAMS | PERCNT | GRAMS | PERCNT | GRAMS | PERCNT |
| 5 | 2710.4 (g) | — | — | 49.6 | 558 | 40 | 620 | 50 | 62 | 10 |
| 6 | 2710.4 (g) | — | — | 49.6 | 372 | 30 | 744 | 60 | 124 | 10 |
| 7 | — | — | 2710.0 (g) | 49.6 | 826.7 | 66.6 | 413.3 | 33.3 | 0 | 0 |
| 8 | — | 2620.7 (g) | — | 49.6 | 413.3 | 33.3 | 826.7 | 66.6 | 0 | 0 |

| SAMPLE GRAFT | RX MOD | | VISCOSITY mPas. 25 C. | WEIGHT PERCENT VINYL (calc.) | ON (calc.) |
|---|---|---|---|---|---|
| | 1-DODECANE THIOL | MORPHOLINE (a) | | | |
| 5 | 12.4 | — | 2800 | 25.58 | 25 |
| 6 | 12.4 | — | 2720 | 27.84 | 25.3 |
| 7 | — | 12.4 | 3880 | 27.92 | 115.8 |
| 8 | 12.4 | — | 4970 | 27.96 | 25.2 |

(a) = CHARGED WITH STREAM #2.

EXAMPLE 4

Foam samples were prepared from graft polyol samples 5–8 to measure the effect of DMAEMA on foam shrinkage. The following foam formulation was employed: Blending mixture, styrene or 4-methylstyrene, and (c) 10 weight percent to 25 weight percent, based on the weight of the monomer mixture, 2-hydroxyethyl methacrylate.

* * * * *